May 8, 1951 W. H. REKDAHL 2,552,215
INSTRUMENT FOR DRAWING CURVED LINES
Filed April 23, 1945 3 Sheets-Sheet 1

Inventor
Wallace H. Rekdahl
By Clarence A. O'Brien
and Harvey B. Jacobson
Attorneys May 8, 1951        W. H. REKDAHL        2,552,215
INSTRUMENT FOR DRAWING CURVED LINES
Filed April 23, 1945        3 Sheets-Sheet 2
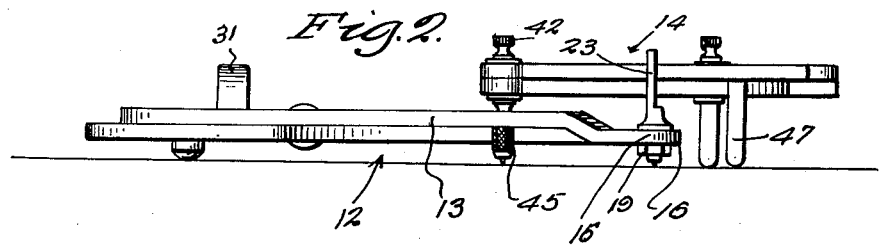
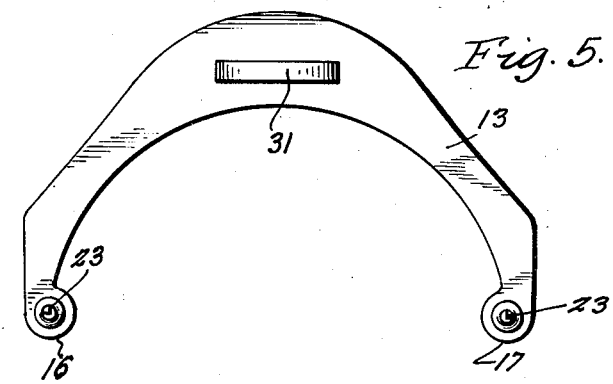
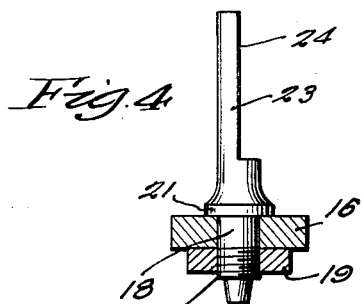
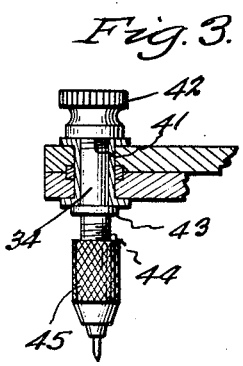
Inventor
Wallace H. Rekdahl
By Clarence A. O'Brien
and Harvey B. Jacobson
Attorneys

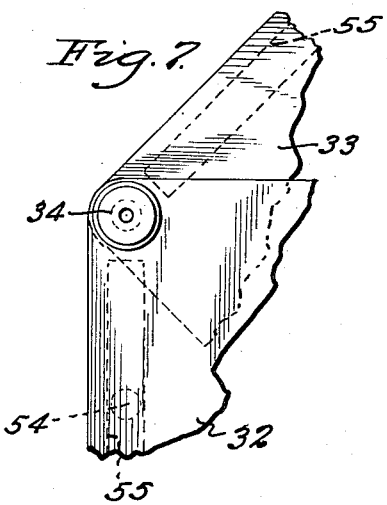
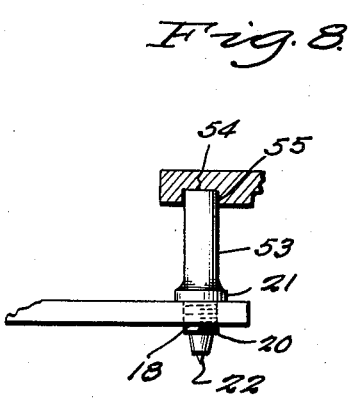
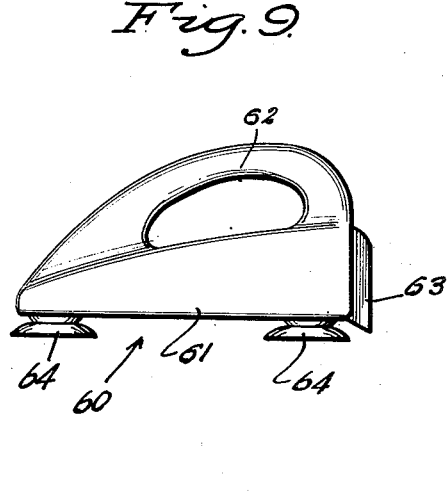
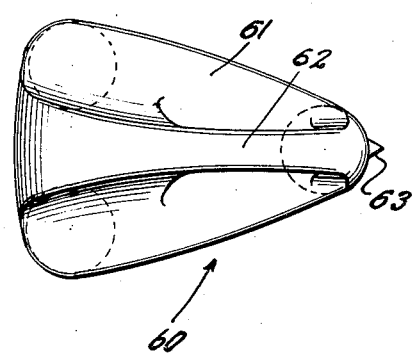

Patented May 8, 1951

2,552,215

UNITED STATES PATENT OFFICE 2,552,215

INSTRUMENT FOR DRAWING CURVED LINES

Wallace H. Rekdahl, Minneapolis, Minn., assignor of one-half to M. Emmett Bailey, South Minneapolis, Minn.

Application April 23, 1945, Serial No. 589,765

3 Claims. (Cl. 33—27)

This invention relates to instruments for drawing curved lines and it has for its main object to provide an instrument of this type by means of which lines forming part of a circle may be traced, or by means of which a tool of some kind or an electrode of a tool is moved along a circular or arcuate path.

Arcs of true radius may, as a matter of course, be drawn by means of a compass if the radius is small and by means of a beam compass if the radius of the circle is larger, but beyond the reach of the beam compass the drawing of arcs of true radius presents some difficulties. The present invention therefore does not intend to replace the compass but to offer an instrument operating beyond the limits of the compass.

As certain types of work, such as the construction of highways or railroads requires the drawing of arcs of true radius for which neither compass nor beam compass may be used, certain instruments have been constructed consisting of curved rules, the curvature of which corresponds to the desired radius.

This method has, however, many disadvantages. A collection of such rules has to be kept at hand and to be arranged and maintained in a predetermined order. If the collection is large the location of the rule with a required radius and the maintenance of a prescribed order is difficult and requires much time and effort. If the collection is small the rule with the required radius will not be found. The collection of curved rules, therefore, falls into disuse in most cases, the draftsman using all kinds of makeshifts or approximations with the instruments he happens to have at hand.

It is therefore a more specific object of the invention to provide an adjustable instrument by means of which arcs may be drawn with any radius which may be required, special emphasis being laid on the arcs whose radii exceed in length those within the range covered by compasses of all sizes. This object is attained by basing the construction of the instrument on a geometrical principle which does not require the direct or indirect use of the centre of the circle.

All angles based on a chord transecting a circle with their vertex in the periphery of the circle and their legs passing through the points of intersection of the circle with the chord are equal. This geometrical principle may form the basis for the construction of an instrument having a movable member provided with two sides arranged at an angle with respect to each other with a registering scribe arranged at the intersection of the sides and cooperating with two fixed members in such a way that the sides of the movable member, while moved, are permanently in contact with the two fixed points.

The present invention consists essentially in the practical embodiment of the constructive principle as above outlined.

It has already been explained that to have practical usefulness an important object of the invention consists in the adjustability of the instrument for different radii. It will be seen that, by virtue of geometrical principle, two means for adjusting the trajectory of the scribe so as to correspond to an arc of a given radius present themselves. One of these means is connected with the angle enclosed by the sides of the scribe carrying member, while the other is connected with the distance between the points of intersection of the chord with the periphery of the circle.

One of these means or both may be employed for adjusting the instrument for an arc of a given radius. It will however be clear that the fact that the selected geometrical principle permits two different ways of adjustment may be exploited to secure either a very wide range of adjustment or a very fine and accurate adjustment or both.

The way in which the above explained principles have been embodied in the construction of a practical drawing instrument will best be understood when reference is made to the accompanying drawings illustrating several modifications of the instrument and to the detailed description of these specific examples. It is however to be understood that these specific modifications are only illustrative and intend to show by way of example how the above explained principles may find their application. The description and illustration of a tracing instrument is not intended to exclude a similar use of the construction in tools. This description does not attempt to be exhaustive and is not intended to be limitative. It is obvious to experts skilled in this art that other modifications may be constructed which still will embody the invention using merely the guidance offered by the examples illustrated and the skill of the expert. The modifications illustrated have been so devised and so described as to foreshadow such further modifications and the actual construction of the same does therefore not constitute a departure from the essence or spirit of the invention.

In the accompanying drawings:

Figure 2 is an elevational view showing a side view of the instrument when resting on a drawing board.

Figure 3 is a partly sectional elevational view illustrating the fixation of the registering or drawing scribe or point on the instrument.

Figure 4 is a partly sectional elevational view of the means for fixing the end points of the chords and for guiding the movable scribe carrying member so as to be in permanent contact with such points of fixation.

Figure 5 is a plan view of a modification of the member provided with the two fixed points, in which this member is not adjustable.

Figures 7 and 8 are plan and elevational views, respectively, of a modification of the guiding means for the movable member or the fixed points.

Figures 9 and 10 are elevational and plan views, respectively, of anchor or fixation members forming part of another modification of the invention in which the fixed points at the end of the chord are formed by separate members not connected with each other.

Figure 1:
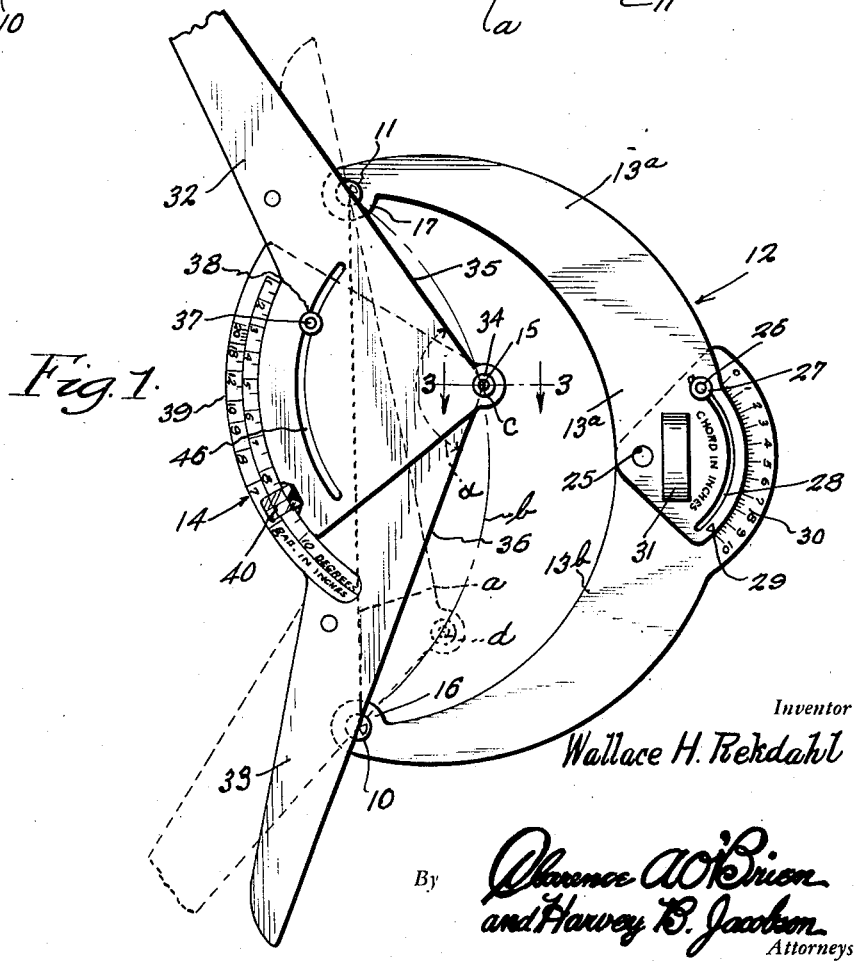
Figure 1 is a plan or top view illustrating one modification of the drawing instrument when seen from above.

The way in which the above explained principle is embodied in the instrument will be easily understood when referring to the modification illustrated in Figures 1 and 2 of the drawings. The chord forming the base for the peripheral angles is represented by the lines 10 to 11 drawn in dotted line, and indicated by the reference letter $a$. The arc of the circle is shown in dots and dashes and is indicated at $b$. Two points of location of the vertex of angles based on the chord $a$ and on the arc of the circle $b$ whose legs are passing through points 10 and 11 (indicated partly in heavy and partly in dotted lines) are shown at $c$ and $d$. These indications will clearly show the geometrical base of the instrument.

The instrument itself comprises a brace designated in general by 12, carrying the means for fixing the chordal points 10, 11 and the movable angular member carrying the scribing means designated in general by 14.

The brace, according to the modification shown in Figure 5, comprises a bail 13 of arcuate or lunicular shape provided with two disk shaped end portions 16 and 17. In these disks as seen in Figure 4, a bolt 18 is fixed by means of a collar 21 and of a nut 19 engaging a screw threaded portion 20 of the bolt. The lower end of the bolt carries a pointed conical pin or a needle 22 capable of penetrating into the surface of the board or paper on which the drawing is made, and thereby fixing the position of the chordal point 10 or 11 located at the center of the bolt. The upper part of the bolt carries an upright 23, preferably of quadrant shape with plane surfaces 24 passing exactly through the center of the bolt and therefore intersecting along a line coincident with a vertical line through point 10 or 11.

The brace 12 may consist of one piece only as shown in Figure 5 but in order to be able to adjust the length of the chord $a$ and the distance between the chordal points 10 and 11 it may consist of two members 13a, 13b joined by a pivot 25. One of the two brace members 13b may carry a screw bolt 26 and a milled nut 27 screwed into it which passes through an arcuate slot 28 provided in the second member 13a. The screw serves the purpose of fixing the relative position of the two brace members after adjustment has been performed. One of the members 13a also carries a pointer, an indicating mark, or knife edge 29 or the like cooperating with a scale 30 carried by the second member 13b. The scale is preferably not graduated in terms of angles which correspond to the de facto relative movement but in length units indicating the distance between the chordal points 10 and 11. The scale is used in accordance with tables which may be printed or engraved either on the instrument or on an auxiliary adjustment chart or on the range finder described later.

To increase precision of adjustment the scale may be provided with a vernier (not shown) for fine adjustments.

The upper member 13a is moreover provided with a handle 31 with which the brace of the instrument may be seized and placed at the required spot.

The movable angular member 14 consists of two wings or legs 32 and 33 pivotally connected with each other by means of a pivot 34. Each leg is provided with a guiding edge 35, 36, respectively, and these two edges intersect at the point 15 which is coincident with the axis of the pivot 34 and which when the member 14 is firmly applied against the uprights 23 is moreover coincident with one of the points representing the vertex $c$ of a triangle based on the chord $a$.

To permit an adjustment of the angle $\alpha$ between the guiding edges around the pivot and the fixation of the parts after the proper selection of said angle, member 32 is provided with a slot 46 while member 33 carries a screw threaded bolt 37 projecting through the slot and carrying a milled nut 38. Member 33 moreover carries a scale 39 which in this case is preferably a double scale graduated in one part in degrees indicating the angular relationship between the two leg members 32, 33 while the second graduation may directly indicate in inches the length of the radius of the circle based upon a definite length of the chord.

Member 32 carries the pointer, window frame or other indicating means 40 permitting exact reading of the scale.

The bolt 34 inserted at intersection point 15 carries the tracing, drawing or other appliance used for tracing or marking the curved line. The bolt is provided with screw threads 41 at one end which engage a nut 42 provided with a milled edge. It is provided with a collar 43 and the end below the collar may be formed as a pencil holder 45 (as shown in Figure 3) or as a tracing pen or merely as a pin similar in this respect to the pins as used on the bolts for the chordal points. The construction shown facilitates exchange of the entire scribing structure which may be removed after removal of nut 41 so that another bolt provided with another tracing or marking appliance may be inserted without difficulty.

In order to support the movable angular member 14 in a plane parallel to the tracing board, it is finally provided with supporting legs 47 which may be riveted to or screwed into the members 32, 33.

Figure 6:
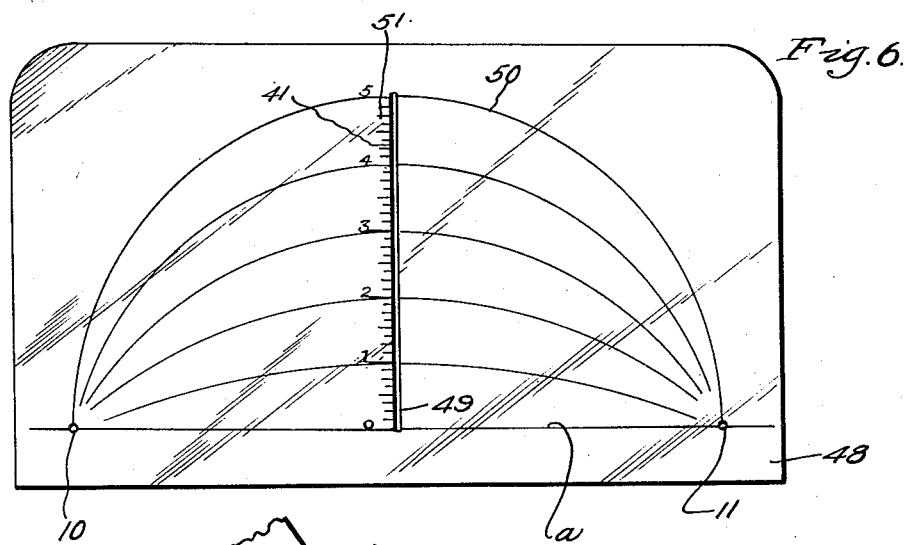
Figure 6 is the point or range finger which is preferably used in conjunction with the instrument.

The operation of the instrument is very simple. It is possible to operate it by means of tables alone especially if the numerical values of the length of the radii of the arcs to be drawn are known. However, it is preferable to use the auxiliary drawing aid or range finder 48 shown in Figure 6 which may consist of Celluloid or any other transparent material and is provided with a slot 49 and with curved lines 50 etched or engraved in its surface. The curved lines are arcs of circles of varying radii passing through the two chordal points 10, 11. The chord a is marked by a straight line drawn between the points 10, 11 and the slot is provided with a scale 51.

Assuming that several points of the arc of the circle are given so that the true or the approximate course of the curved line representing the arc is known, as is almost invariably the case, then the chordal points of the range finder are brought into coincidence with two arbitrarily selected known points of the arc and the point on the scale through which the arc to be drawn will pass is noted. If the numerical value of the length of the radius is known the point on the scale where the arc has to pass is marked and is noted. The graduation on the scale 51 may be such that the adjustment of the angle between the sides of members 32 and 33 may be made immediately in accordance with its indications. Or, alternatively, the length of the radius of the arc to be drawn may be used as a reference to be found in scale 51 as well as in scale 39. If the length of the chord is not found suitable a table engraved on the drawing aid may give the angular relations corresponding to other chords.

The instrument itself is manipulated by first adjusting the length of the chord by then placing the needle points 22 on the selected points 10, 11 of the arc using the handle, if necessary, by inserting the proper tracing or marking instrument into the movable member, by adjusting the angle according to the indications on the table to be consulted or according to the indicator on the drawing aid and by then seizing the unit or knob 42 placing it first as closely as possible to one of the chordal points or to the point where the curve starts and by then drawing the curved line with a slight outward pressure towards the brace so that the sides of the members 32 and 33 remain firmly pressed against the uprights 23 during the process.

The double adjustment which may be made provides for a wide range of curvatures and lengths of arc and also for great precision. However, as these requirements have not to be met with all types of work, the instrument may be simplified by providing a fixed brace 13 such as shown in Figure 5. Its construction has already been described.

A further modification of the guiding means for the movable or angular member 14 is shown in Figures 7 and 8 which provides a more positive guiding of said member, eliminates the necessity of exerting a slight pressure in an outward direction when tracing the curve and also eliminates the protruding uprights which may be caught by some movement of the operator or some object and are then easily displaced thus upsetting the selected adjustment.

The bolts 18 as shown in Figure 8 are provided with screw threads engaging directly screw threads provided in the discs 16 of brace 13. This eliminates the nuts and permits a closer approach of the instrument to the tracing board, and a reduction of the height. Above the collar 21 only a short guiding upright 53 is provided which may have the shape of a cylindrical bolt or pin with a flat end 54. The legs 32, 33 of the movable member 14 are provided with grooves 55 at their underside into which the flat end 54 of the upright enters. These grooves if cut to the width of the diameter of upright 53 provide a positive guiding of the movable member in all directions so that no pressure is necessary to keep the movable member 14 on the chordal points during its movement.

When making topographical and other plans or charts in connection with highway or railroad projects or the like it is sometimes necessary to draw arcs with a radius of very great length for which the described instrument would still be inadequate as its limited chordal base would only permit the tracing of a small part of the arc. In such cases a chord has to be used the length of which can no longer be covered by the span of a brace as its size and weight would interfere with easy manipulation.

In this case the chordal points are formed by separate anchor pieces or blocks 60 as shown in Figures 9 and 10. Such a block merely consists of a body 61 of sufficient weight provided with a handle 62 and with a knife edge 63 serving as a guide for the movable member in the same way in which the uprights 23 served as a guide. The body is fixed by its weight but may be provided with suction cups either to provide additional staying power or to reduce the weight which would otherwise be necessary. These anchor pieces or blocks are placed on the chordal points 10, 11 in such a way that a vertical line through chordal points 10 or 11 coincides with the knife edge 63. They are manipulated separately and form separate units. They may clearly be placed at any distance consistent with the length of the sides of the angular or movable member 14 to be placed between them.

Other modifications dealing with special problems will be obvious to those skilled in the art, and it will especially be manifest that the construction described may be used for guiding a machine or hand tool, an electrode or an electric cutter or the like along the arc of a circle, the modifications necessary for such a constructional change being only those obvious to the expert and entailed by the special purpose in view.

I claim:

1. A drawing instrument for drawing circles by means of two chordal points located in the periphery of the circle and serving as fixed points for the legs of an angle the vertex of which moves between said points, comprising two pivoted angularly adjustable members, each provided with a straight edge, a pivot joining said members arranged at the point of intersection of the said straight edges, said pivoted members being further provided with arcuate fixation means and with an arcuate scale and pointer both centered on said pivot point, an arcuate brace member, encircling an approximately semi-circular free space and carrying at its ends on its underside needle points adapted to be set on the predetermined chordal points and further carrying substantially vertical upwardly projecting posts on its upper side provided with substantially vertical guiding edges, located on a line passing through said chordal points, said free space encircled by the arcuate brace member being located on the convex side of the curve drawn and being adapted to receive the angularly adjustable pivoted members.

2. A drawing instrument for drawing circles by means of two chordal points located in the periphery of the circle and serving as fixed points for the legs of an angle the vertex of which moves between said points, comprising an arcuate brace member, encircling an approximately semi-circular free space on the convex side of the curve to be drawn, carrying at its ends on its underside needle points adapted to be set on the predetermined chordal points, and further carrying on its upper side substantially vertical upwardly projecting posts provided with substantially vertical guiding edges located on a line passing through said chordal points, two pivoted angularly adjustable, partially overlapping, substantially triangular members with two straight working edges, adapted to be applied against said vertical guiding edges of the upwardly projecting posts, a pivot joining the aforesaid angularly adjustable substantially triangular members, a curve drawing means carried by said pivot the axis of said pivot being located at the point of intersection of the straight edges, said pivot and straight edges when applied against the said guiding edges of the upwardly projecting posts moving in the free space encircled by the arcuate brace, said partially overlapping substantially triangular members being provided with an arcuate scale centered on the pivot and with a pointer respectively, and with cooperating arcuate fixation means on the overlapping portions, said scale indicating the radius of the circle to be described by the curve drawing means.

3. A drawing instrument for drawing circles by means of two chordal points located in the periphery of the circle and serving as fixed points for the legs of an angle the vertex of which moves between said points, comprising an arcuate brace member, consisting of two angularly adjustable arcuate sections, encircling an approximately semi-circular free space on the convex side of the curve to be drawn and pivoted to each other, said brace member having overlapping sections, one of said sections being provided with a graduation scale while the other section is provided with a pointer adapted to slide along said scale and both sections being provided with fixation means adapted to fix said sections in a predetermined relative position, each arcuate section carrying near its end on its underside a needle point adapted to be set on the predetermined chordal point and carrying on its upper side a substantially vertical upwardly projecting post provided with substantially vertical guiding edges, two pivoted angularly adjustable members, each provided with one straight edge, a pivot joining said two angularly adjustable members, curve drawing means carried by said pivot, said pivot being arranged at the point of intersection of the said straight edges, the aforesaid pivoted members being further provided with arcuate fixation means and with an arcuate scale and a pointer respectively, both arranged at a distance from and centered on the pivot point, said angularly adjustable pivoted members when applied with their straight edges against the guiding edges of the upwardly projecting posts projecting into and moving within the free space encircled by the arcuate brace member on the convex side of the curve to be drawn.

WALLACE H. REKDAHL.

REFERENCES CITED

The following references are of record in the file of this patent:

UNITED STATES PATENTS

| Number | Name | Date |
|---|---|---|
| 650,799 | Sanders | May 29, 1900 |
| 861,400 | Sheridan | July 30, 1907 |
| 866,178 | Allen | Sept. 17, 1907 |
| 880,796 | Horrocks | Mar. 3, 1908 |
| 915,926 | Allen | Mar. 23, 1909 |

FOREIGN PATENTS

| Number | Country | Date |
|---|---|---|
| 84,779 | Switzerland | Aug. 2, 1920 |
| 150,146 | Great Britain | Sept. 2, 1920 |